United States Patent
Guru (10) Patent No.: US 7,474,654 B2
(45) Date of Patent: Jan. 6, 2009

(54) METHOD AND SYSTEM FOR CLASSIFICATION OF PACKETS BASED ON META-RULES

(75) Inventor: Parthibhan Parama Guru, Vimanapura post (IN)

(73) Assignee: Cisco Technology, Inc., San Jose, CA (US)

(*) Notice: Subject to any disclaimer, the term of this patent is extended or adjusted under 35 U.S.C. 154(b) by 640 days.

(21) Appl. No.: 11/043,362

(22) Filed: Jan. 26, 2005

(65) Prior Publication Data
US 2006/0164980 A1 Jul. 27, 2006

(51) Int. Cl.
*H04L 12/28* (2006.01)
*G06F 12/00* (2006.01)

(52) U.S. Cl. .................... 370/389; 711/137

(58) Field of Classification Search .......... 370/229, 370/289, 230, 414, 389
See application file for complete search history.

(56) References Cited

U.S. PATENT DOCUMENTS 6,463,068 B1 10/2002 Lin et al.
6,798,777 B1* 9/2004 Ferguson et al. ............ 370/392
7,236,493 B1* 6/2007 McRae .................... 370/392
2004/0213224 A1 10/2004 Goudreau
2005/0226235 A1* 10/2005 Kumar et al. .............. 370/386

OTHER PUBLICATIONS

Gupta et al., 1999, "Packet Classification on Multiple Fields", Association for Computing Machinery (ACM) SIGCOMM '99.*

* cited by examiner

*Primary Examiner*—Steven H. D Nguyen
*Assistant Examiner*—John Blanton
(74) *Attorney, Agent, or Firm*—Trellis IP Law Group, PC (57) ABSTRACT

A method and apparatus for classification of packets is provided. The method includes classifying the packets based on the structured part of at least one packet classification rule, and classifying the packets based on the unstructured part of the at least one packet classification rule, the classification being done based on the structured classification results. The packet classification method provides a technique for splitting the n-dimensional space of the packet header fields into disjoint regions. The splitting is done such that all the packets falling into a region have the same packet classification result. The first packet falling into a region takes a longer time for classification, where the logical expression resulting from user-configured rule is solved. The classification of all subsequent packets falling into the same region gets accelerated and takes less time than the first packet to classify.

22 Claims, 9 Drawing Sheets

| Dimension1 | Source port | Dimension2 | Destination port | Action |
| --- | --- | --- | --- | --- |
| R1 | 30 – 40 | C1 | 30 – 40 | Action1 |
| R2 | 20 – 80 | C2 | 20 – 80 | Action2 |
| R3 | 0 – 100 | C3 | 0 – 100 | Action3 |

METHOD AND SYSTEM FOR CLASSIFICATION OF PACKETS BASED ON META-RULES

BACKGROUND OF THE INVENTION

1. Field of Invention

This invention relates in general to network management. More specifically, the invention relates to methods and systems for high-speed classification of a packet.

2. Description of the Background Art

Many advanced Internet services require routers to classify packets, based on a given criteria. Examples of advanced Internet services include routing, policy-based routing, load balancing, rate limiting, access-control in firewalls, virtual bandwidth allocation, service differentiation, traffic shaping, and traffic billing. Conventional packet classification requires the router to classify a packet, based on multiple fields in its header. The router classifies incoming packets into different groups and then performs appropriate actions, depending on the group the incoming packet belongs to, for each of the above services. A classifier specifies these groups. A classifier is a set of filters or a set of rule. For example, each rule in traffic billing could specify a set of source and destination addresses, and associate a corresponding action with it. Each of the rules in the classifier specifies a class for each of the packets, based on the fields of the packet header. Each class has an identifier, called a class ID, associated with it.

Advanced classification of packets can be based on class of service (COS) and quality of service (QoS). This advanced classification requires the router to classify the packets, based on multiple fields in the packet header. The packet header fields used for classification can be from layer 2, 3, 4, 5, and above. Known packet classification on multiple fields is carried out by using Access Control Lists (ACLs) An ACL comprises an ordered list of access control entries (ACEs). In an ACE, each rule defines a pattern (criterion) that is compared with packets to be classified. All ACEs have a similar structure, i.e., the packet header fields used in constructing an ACEs have fixed position and are related to each other by AND logical operator inside ACE. The absence of a field in a rule at pre-determined position can be assumed as a wildcard entry. Different packet classification algorithms, such as the Request for Comment (RFC) algorithm and the Turbo Access Control List (ACL) algorithm, make use of the structure present in the ACL rules to achieve speed and memory balance. RFC is the packet classification technique described in a publication titled, "Packet Classification on Multiple Fields," by P. Gupta et al., Association for Computing Machinery (ACM) SIGCOMM '99 Proceedings, September 1999, Harvard University. Turbo ACL is Cisco patented packet classification technique, described in U.S. patent application Ser. No. 10/170,896 titled, "Incremental Compilation for Classification and Filtering Rules", filed on Jun. 13, 2002.

In recent times, there has been a demand for flexible methods of defining more complex packet classification rules. The complex packet classification rule may include rules that have an undefined structure, i.e., the packet header fields used in defining the rule may not have a predetermined logical relation between them and are recognized by keywords preceding the field value. The logical relation between field values may be user configurable in undefined structure rules. However, the algorithms mentioned above, i.e., RFC and Turbo ACL algorithm cannot be used where the structure of the rules is not defined.

Although, some of the recent packet classification languages support nested rules, i.e., rules inside rules, thrice-nested rules, and so on, infinitely recursing rules are not used in packet classification. In a nested packet classification rule, the inner most rules or leaf rules are structured rules, whereas all the remaining rules, from leaf to top, are rules with undefined structure. The nested rules thus described are hereinafter referred to as meta-rules. However, the RFC and Turbo ACL algorithms mentioned above cannot be used with meta-rules.

SUMMARY OF EMBODIMENTS OF THE INVENTION

In one embodiment, the invention provides a method for classification of packets based on meta-rules. The method includes (i) classifying the packets, based on the structured part of at least one packet classification rule, and (ii) classifying the packets, based on the unstructured part of at least one packet classification rule, the classification being carried out on the basis of the structured classification results.

In another embodiment, the invention provides a method for classification of a packet, based on class of service, QoS, and the packet classification rules. The method includes (i) splitting the packet header into a predetermined number of fields, (ii) generating a set of equivalence classes for each of the pre-determined number of fields, (iii) determining a unique equivalence class matching the packet in each of the fields, and (iv) using a cross-product of the unique equivalence classes to capture the results of the classification, based on the unstructured part of at least one packet classification rule.

In yet another embodiment, the invention provides an apparatus for classification of a packet. The apparatus comprises (i) means for classifying the packet, based on the structured part of at least one packet classification rule, and (ii) means for classifying the packet, based on the unstructured part of at least one packet classification rule.

In another embodiment, the invention provides an apparatus for classification of a packet, based on COS, QoS, and the packet classification rules. The apparatus includes a processing system, with a processor coupled to a user input device; a machine-readable medium that includes instructions executable by the processor comprising (i) one or more instructions for splitting the packet header into a pre-determined number of fields, (ii) one or more instructions for generating a set of equivalence classes for each of the pre-determined number of fields, (iii) one or more instructions for determining a unique equivalence class matching the packets in each of the fields, and (iv) one or more instructions for using the cross-product of the unique equivalence classes, to capture the results of the classification, based on the unstructured part of at least one packet classification rule.

These provisions, together with the various ancillary provisions and features that will become apparent to those artisans who possess skill in the art, as the following description proceeds, are attained by devices, assemblies, systems, and methods of embodiments of the present invention, various embodiments thereof being shown with reference to the accompanying drawings, by way of example only, wherein:

DETAILED DESCRIPTION OF EMBODIMENTS OF THE INVENTION

For the sake of convenience, appropriate explanations of some terms used in the description of the embodiments are given below. It is to be understood that these explanations have been provided merely to help in understanding the description better, and they are not to be considered as limiting the scope of the invention, as claimed.

Class of Service (COS): COS is a description of the path control network characteristics applicable to a designated session. COS includes virtual route number (VRN), transmission priority (TP), explicit route number (ERN), reverse explicit route number (RERN), and transmission group numbers (TGNs). It is designated at the start of the session through a COS name (COSNAME) that is mapped into VRN, TP, ERN, RERN, and TGNs.

Quality of Service (QoS): QoS refer to the capabilities of a network device that provides a guarantee of performance, such as traffic delivery priority, speed, latency, or latency variation. The delivery of a good quality audio or video streams typically requires QoS capabilities.

Access Control List (ACL): ACL is a list created by users of a computer system, to define access rules for other users. An ACL assigned to an object defines the list of users that may access the object. An ACL typically comprises an ordered list of access control entries (ACEs), i.e., rules, where each rule defines a pattern (criterion) that is compared with data packets to be classified.

Wild card entry: A wild card entry in a field of packet classification rule signifies that the rule accepts all possible valid field values for the field in the rule.

Structured rules: In structured rules, the packet header fields used for classification are related to each other with the help of a pre-determined logical operator, such as AND, OR, NAND, XOR, NOT etc. The packet header fields can be from layer 2, 3, 4, 5 and above, and have fixed position in the rule. Absence of the packet header field in a rule can be assumed as a wildcard entry.

Unstructured rules: In unstructured rules, the packet header fields do not have a pre-determined logical relation between them and are recognized by keywords preceding the field value. The logical relation may be user configurable. The packet header fields do not have a fixed position in the rule and are recognized by keywords preceding the field value. Unstructured rules can take shape of arbitrary logical expression and can have structured rules in them.

Meta Rules: Meta rules signify rules that are defined using other rules. Meta rules have other rules as variables in them. Meta rules comprise the structured rules as well as user-defined unstructured rules. For the purpose of this application, rules include meta rules.

Dimensions: Dimension refers to the number of fields in the packet header. Each field of the packet header is identified as one dimension. Thus, a packet with n-fields is said to have n-dimensions.

The invention provides a method, a system and a computer program product for classifying packets on a network. The packets are classified on the basis of rules, which may have a defined or undefined structure. In particular, the rules specified by a user may have both defined and undefined components. The present invention provides methods and systems for classifying the packets, based on such user-defined rules. Further, the invention provides methods for caching the classified policy maps associated with the packets. The packet classification method is performed by splitting the n-dimensional space of packet header fields into disjoint regions. The splitting is done such that all the packets falling into a region have the same packet classification result. The method and system are explained in detail hereinafter.

Figure 1:
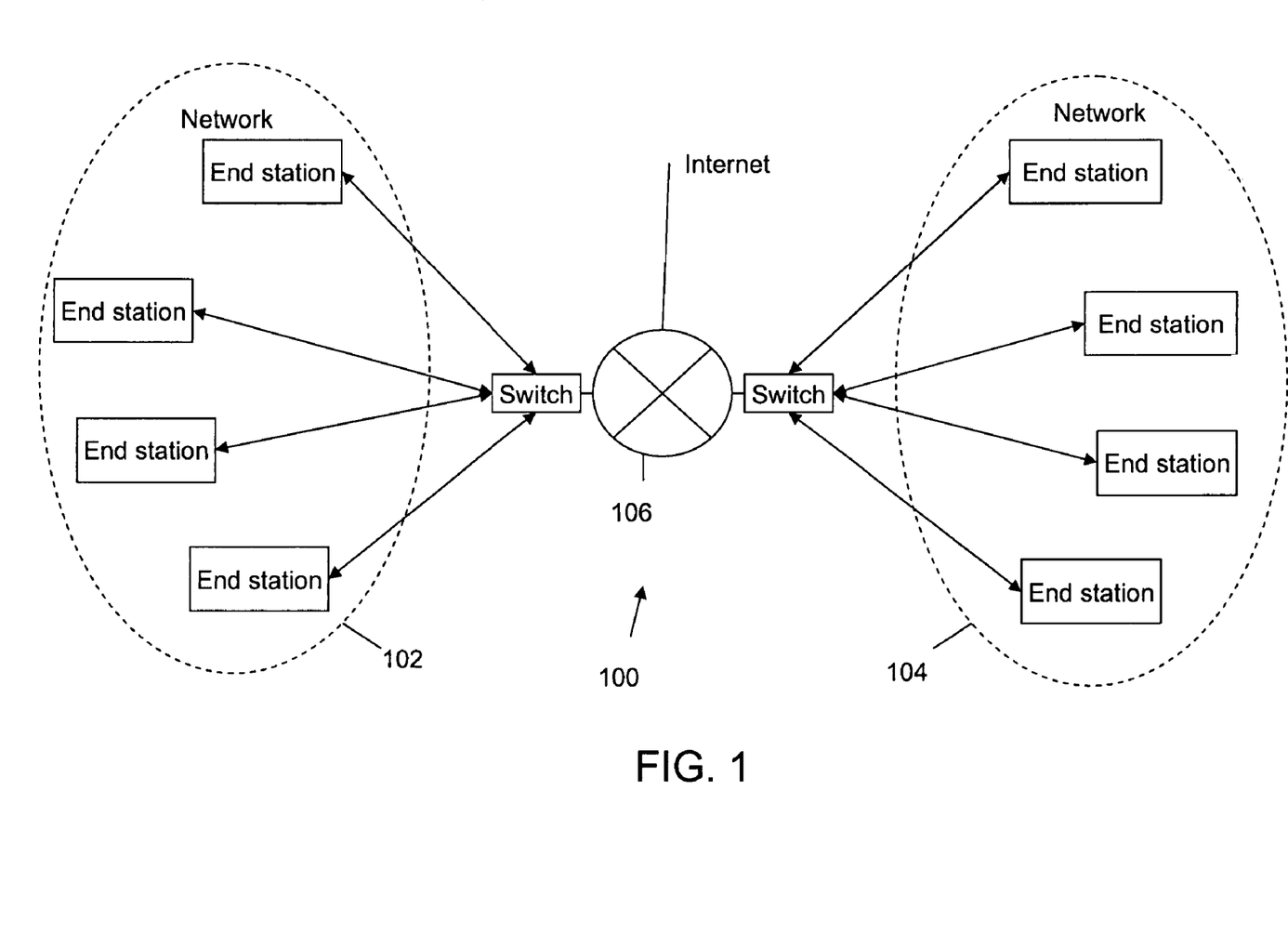
FIG. 1 illustrates an environment for an exemplary embodiment of the invention, which are two different networks of computers, connected to the Internet through a router.

FIG. 1 illustrates an environment for an exemplary embodiment of the invention, comprising a network 102 and a network 104. Networks 102 and 104 comprise end stations connected to the Internet through a router 106, with the help of communication channels.

Router 106 is essentially a computer configured for handling packet transfers between different networks. Router 106 passes data between multiple networks; for example, it is used to connect the users in a Local Area Network (LAN) to the Internet or networks located at other places. Router 106 works at the network link layer, also called layer-3 of a network. Therefore, router 106 should know the packets in order to classify them.

Figure 2:
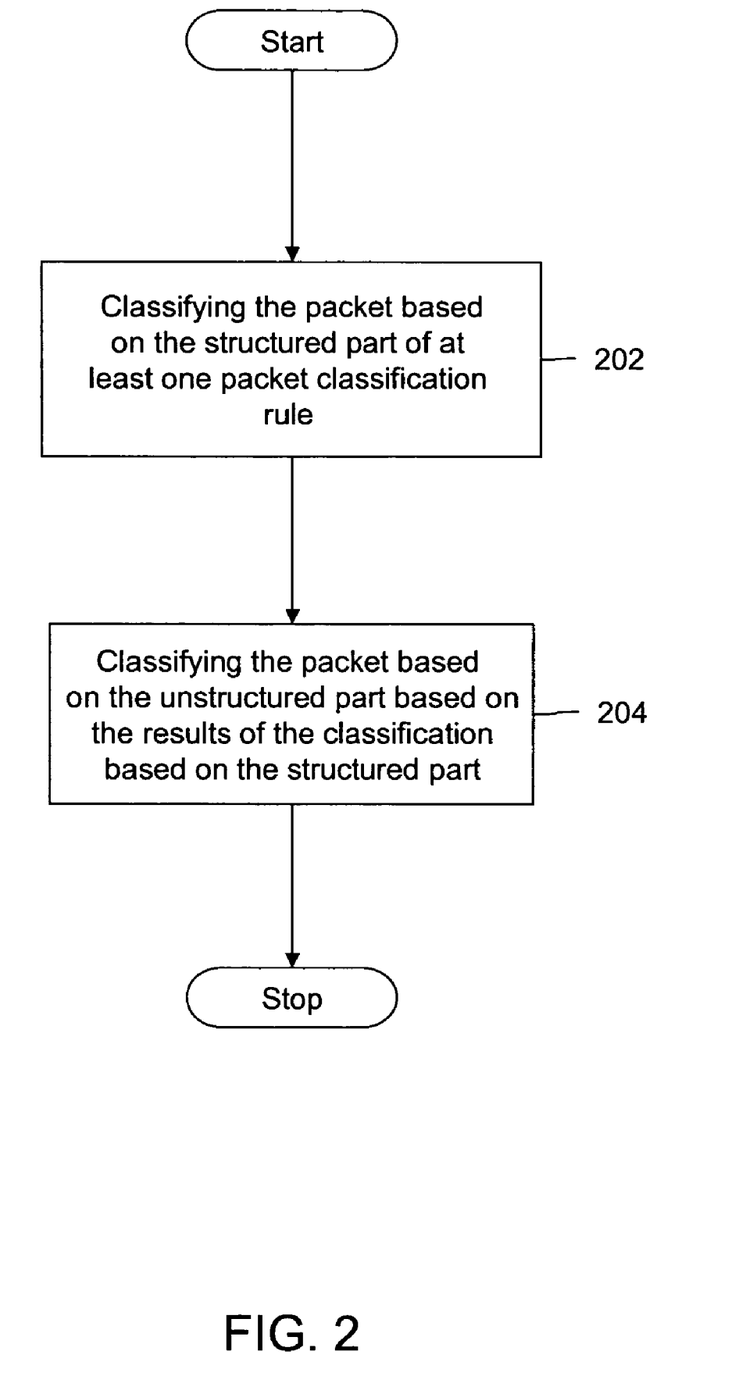
FIG. 2 is a flowchart depicting a method used in classifying packets, in accordance with an exemplary embodiment of the present invention.

FIG. 2 is a flowchart depicting a method used in classifying packets, in accordance with an exemplary embodiment of the present invention. The packets are classified, based on the structured part of at least one packet classification rule, at step 202. In an exemplary embodiment of the invention, classification of the packets, based on the structured part of the packet classification rules, is performed by a Turbo ACL algorithm. In another exemplary embodiment of the invention, classification of the packets, based on the structured part of the packet classification rules, is performed by an RFC algorithm. Classification of the packets, based on the unstructured part of the packet classification rules, is performed at step 204. The result of the structured classification at step 202 is used to perform the classification at step 204. In an exemplary embodiment of the invention, the classification of the packets is based on QoS. In another exemplary embodiment of the invention, the classification of the packets is based on COS.

Figure 3:
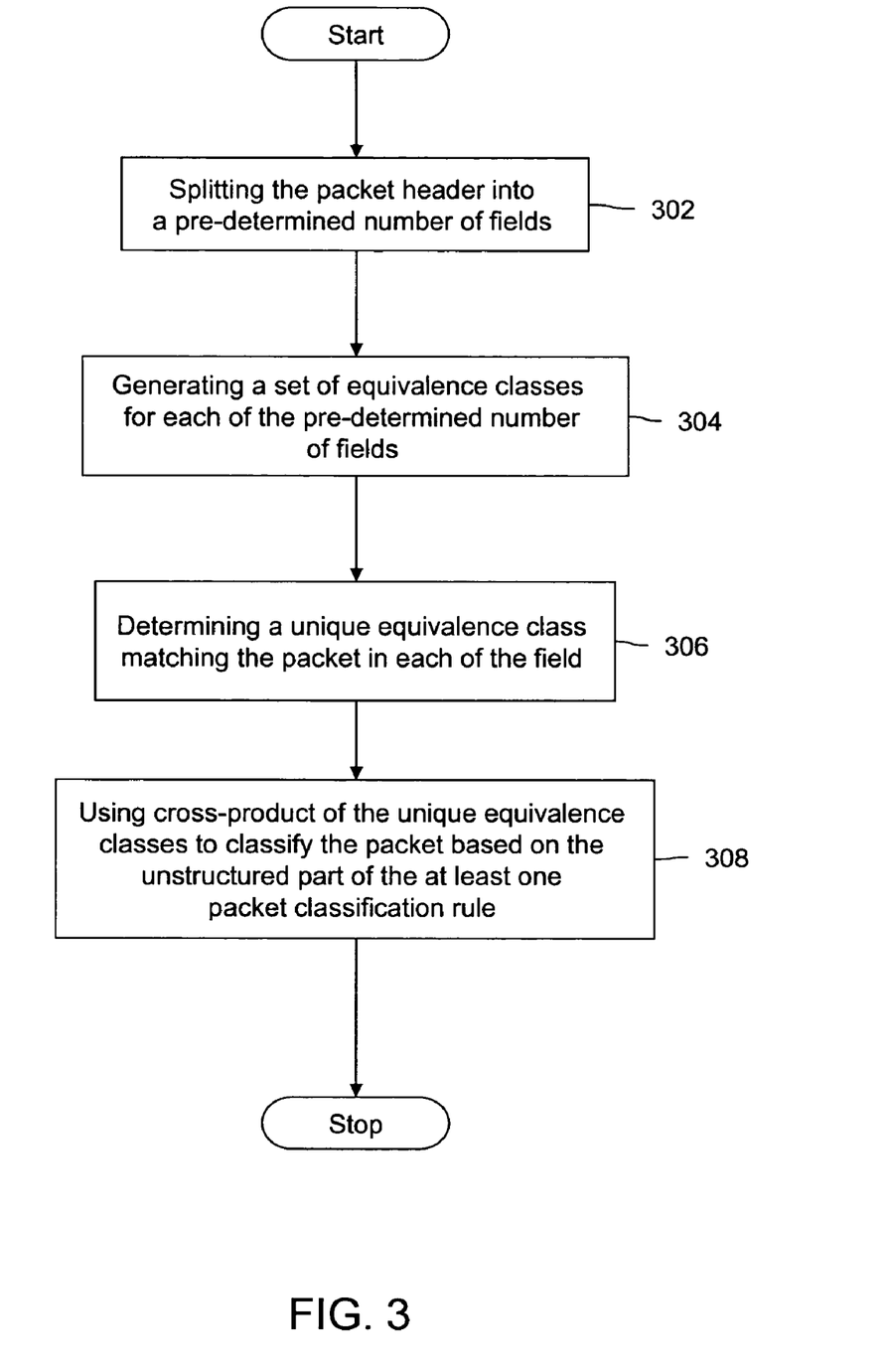
FIG. 3 is a flowchart depicting the steps involved in classifying packets, in accordance with another embodiment of the invention.

FIG. 3 is a flowchart depicting the steps involved in classifying packets, in accordance with an exemplary embodiment of the invention. The packet header is split into a pre-determined number of fields at step 302. In an exemplary embodiment of the invention, the pre-determined number is equal to the number of dimensions of the packet classification rules. In an exemplary embodiment of the invention, the packet classification rules are based on at least one field of the packet header. For each of the pre-determined fields, a set of equivalence classes is generated at step 304. An equivalence class represents a set of all rules matched by the packet in a given dimension. The equivalence class does not lay restriction on whether the rule is a single rule or composite, i.e., a combination of rules. From the set of equivalence classes generated at step 304, a unique equivalence class matching the packet in each of the fields is determined at step 306. A cross product of the unique equivalence classes is then used to classify the packets, based on the unstructured part of the packet classification rule at step 308. In an exemplary embodiment of the invention, the results of the classification, based on the unstructured part of the packet classification rules, include all combinations of packet classification rules and dimensions. In another exemplary embodiment of the invention, the unstructured part of the packet classification rules comprises structured rules as variables. The method is hereinafter further explained with the help of an example.

Figure 4:
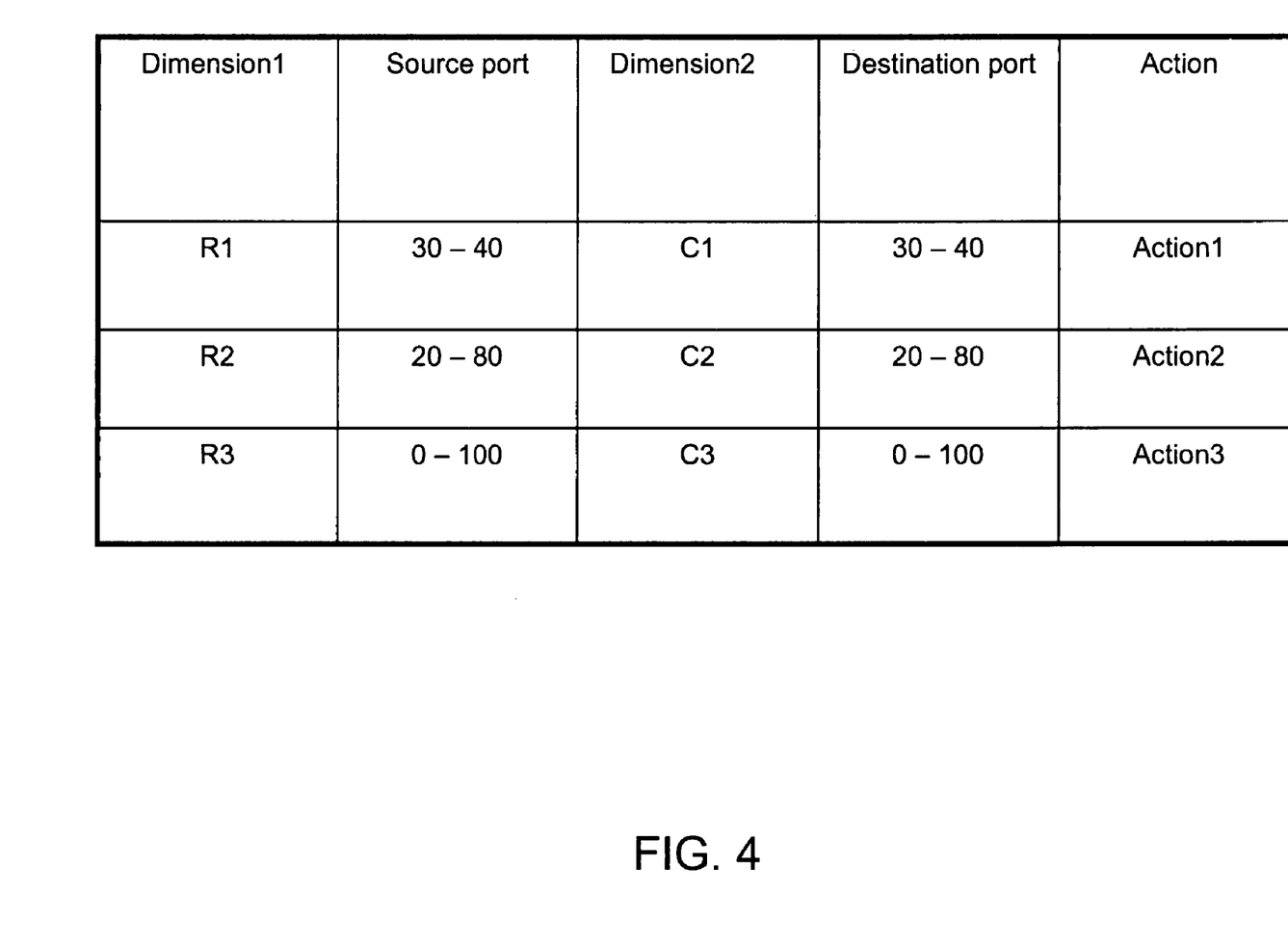
FIG. 4 is a table illustrating a set of rules for packet classification, in accordance with an exemplary embodiment of the invention.

FIG. 4 is a table illustrating a set of packet classification rules, in accordance with an exemplary embodiment of the invention. The table depicts three packet classification rules over two dimensions: the source port number and destination port number of the packet header, and the corresponding action of each of the packet classification rules. R1, R2 and R3 are the packet classification rules for discriminating the packet in dimension 1, i.e., based on the source port. C1, C2 and C3 are the packet classification rules for discriminating the packet in dimension 2, i.e., based on the destination port. The packet classification rules that hold 'TRUE' on a packet in each dimension separately, given the packets' source and destination port, are then determined and further explained in conjunction with FIG. 5.

Figure 5:
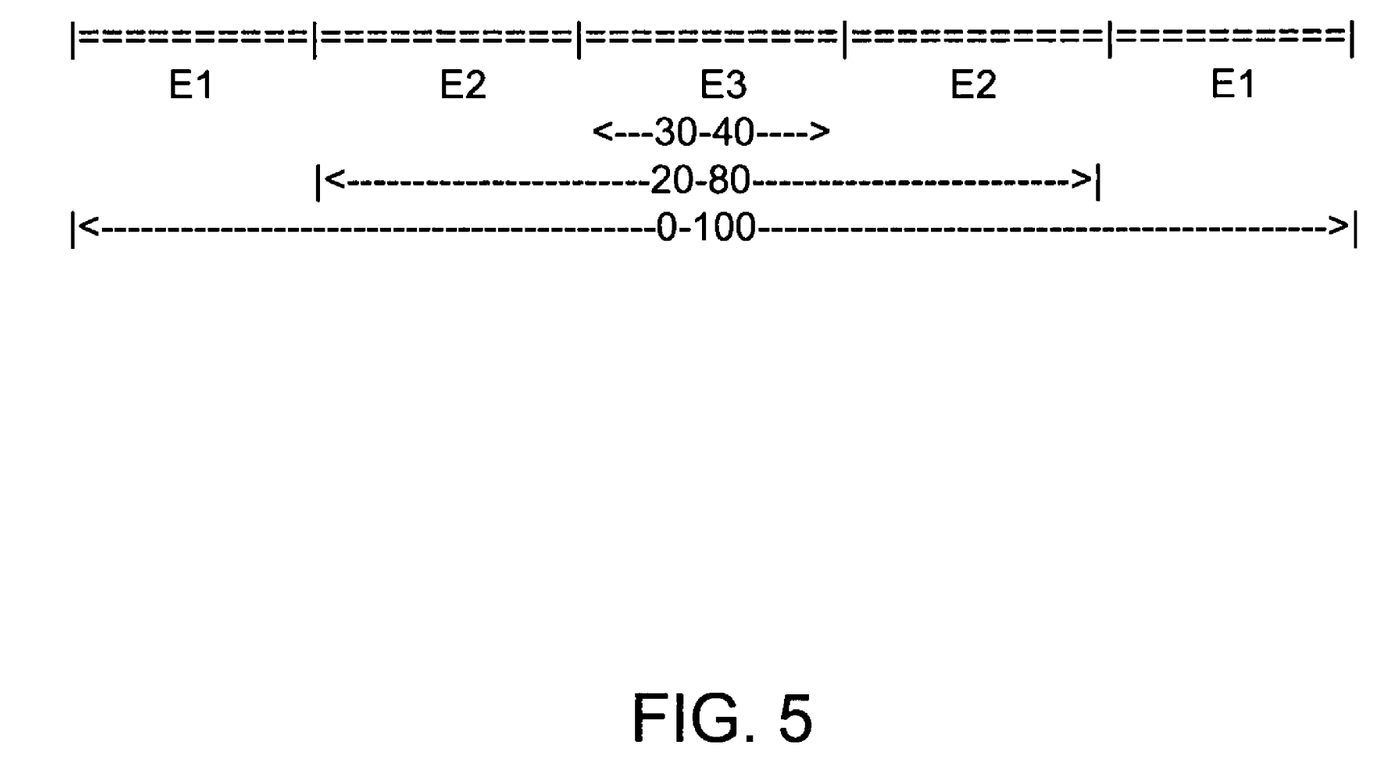
FIG. 5 illustrates a line segment projecting the rules defined on the source port for the example illustrated in FIG. 4, in accordance with an exemplary embodiment of the invention.

FIG. 5 illustrates a line segment projecting the packet classification rules defined on the source port of the example illustrated in FIG. 4, in accordance with an exemplary embodiment of the invention. Using the packet classification rules, equivalence classes are generated for each of the dimensions of the packet classification rules, in accordance with step 304. The equivalence classes generated by using the packet classification rules on dimension 1 are E1={R3}, E2={R2, R3}, and E3={R1, R2, R3}. Similarly, the packet classification rules on dimension 2, the destination port, are projected on a line segment and the equivalence classes are generated. The equivalence classes for dimension 2 are E4={C3}, E5={C2, C3}, and E6={C1, C2, C3}. In an exemplary embodiment of the invention, the equivalence class is a set of all rules under which a packet qualifies. It is to be noted that the packet classification rules defined by a user may not be restricted to one dimension and may be the composite of all the packet classification rules defined in the system for all the dimensions. Consequently, user-defined packet classification rules can be expressed as a function of all the defined packet classification rules in all the dimensions, i.e., R=f(R1, R2, R3, C1, C2, C3), where f is a function on variables R1, R2, R3, C1, C2 and C3. Variables R1, R2, R3, C1, C2 and C3 take either a TRUE or a FALSE value, based on whether the source port and the destination port of the packet satisfy these variables. To further explain, packet classification rules in FIG. 4 can be written in the form of logical expression as If ((src-port>30) && (src-port<40) && (dest-port>30) && (dest-port<40))

then {output=action-1}

Else if ((src-port>20) && (src-port<80) && (dest-port>20) && (dest-port<80))

then {output=action-2}

Else {output=action-3}

The above logical expression can be equivalently written as

If (r1 && c1) then {output=action-1}

Else if (r2 && c2) then {output=action-2}

Else {output=action-3}        (1)

Where r1=(src-port>30) && (src-port<40), c1=(dest-port>30) && (dest-port<40)

r2=(src-port>20) && (src-port<80), c2=(dest-port>20) && (dest-port<80)

r3=(src-port==any), c3=(dest-port==any)

Expression (1) gives the same output as long as src-port and dest-port value of the packet results in the assignment of same truth-values to variables r1, r2, r3, c1, c2 and c3. Expression (1) is true even if the AND operator above is replaced with other logical operators. For example, for packet1: src-port1=25 and dest-port1=25 and for packet2: src-port2=26 and dest-port2=26.

Then r1=False, c1=False, r2=True, c2=True, r3=True and c3=True for both packet1 and packet2. As a result of this packet1 and packet2 have common output by solving the expression (1) above.

From FIG. 5, the equivalence classes for the src-port field can be computed as

E1={r1, r2, r3}=001, wherein bit '1' represents True and bit '0' represents False

E2=011

E3=111

Similarly for the destination port, we can write

E4={c1, c2, c3}=001

E5=011

E6=111

Figure 6:
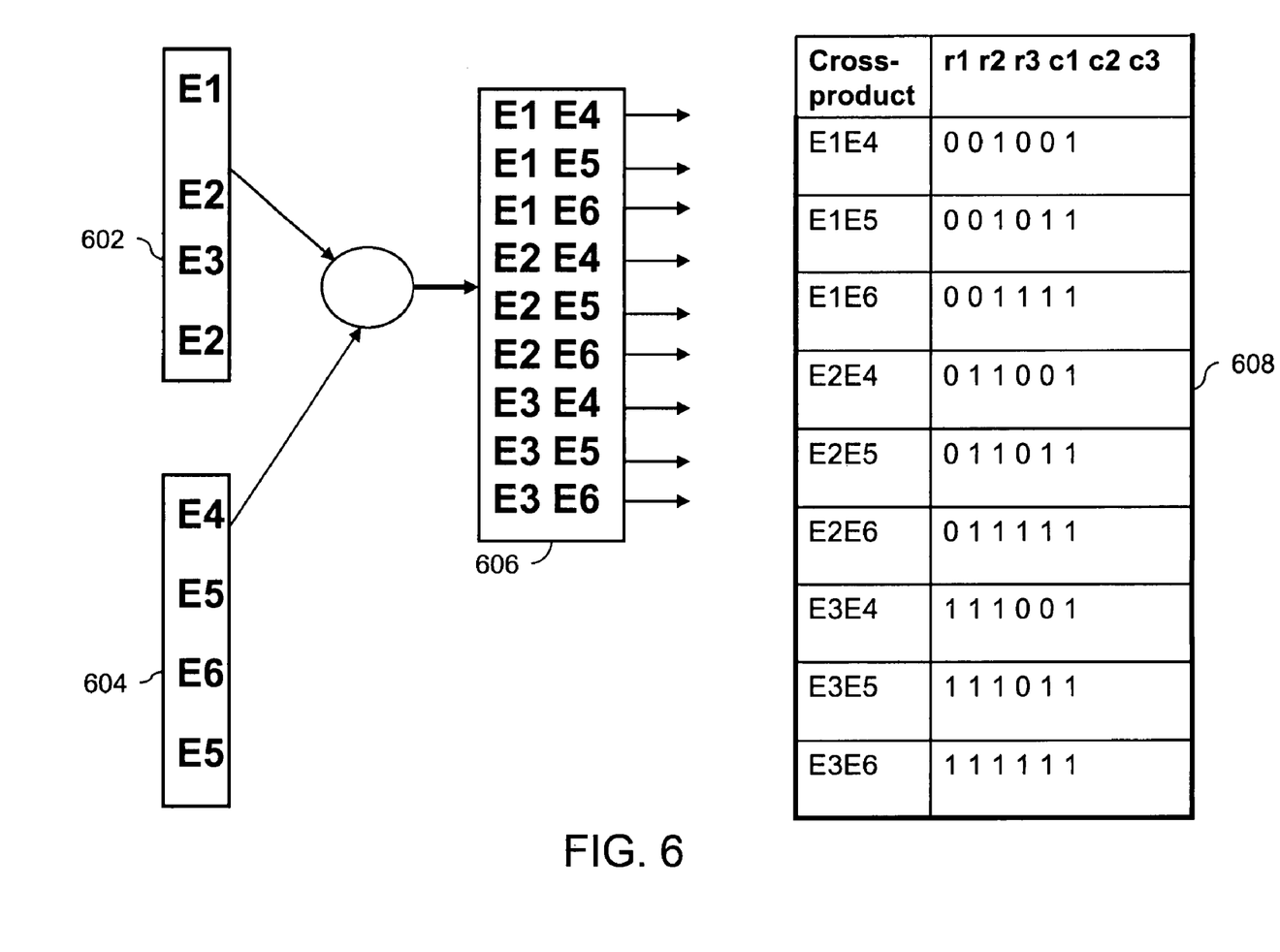
FIG. 6 represents the cross product of the source and the destination port values in terms of bit vectors, in accordance with an exemplary embodiment of the invention.

FIG. 6 represents the cross-product of the source and the destination port values in terms of bit vectors for the example illustrated above. Array 602 gives dimension 1, i.e., src-port, split by range. The size of array 602 is equal to the maximum range of source port. Array 604 gives dimension 2, i.e. dest-port, split by range. The size of array 604 is equal to the maximum range of destination port. The equivalence classes in each of the arrays 602 and 604 are marked with an equivalence id (eq id). For example, E1 has a equivalence id 1, E2 has equivalence id 2 and E3 has equivalence id 3. Similarly in array 604, E4, E5 and E6 have equivalence ids 1, 2 and 3 respectively. Array 606 gives the cross-product of the equivalence classes that are identified by dimensions 1 and 2 split by range. Each region of array 606 is identified by an equivalence id. For example, E1 E4 has a equivalence id 1, E1E5 has a equivalence id 2 and so on till E3E6, which has a equivalence id 9. Array 608 represents the cross-product of the equivalence classes in a bit vector form. As shown in array 608, truth-values of variables r1, r2, r3, c1, c2 and c3 remain constant and does not change within a cross product entry. Therefore, all the packets falling into a particular cross product, say E1E4, share a common truth value for variables r1, r2, r3, c1, c2 and c3. Hence, all the packets mapped to a given cross product entry share a common classification output.

Figure 7:
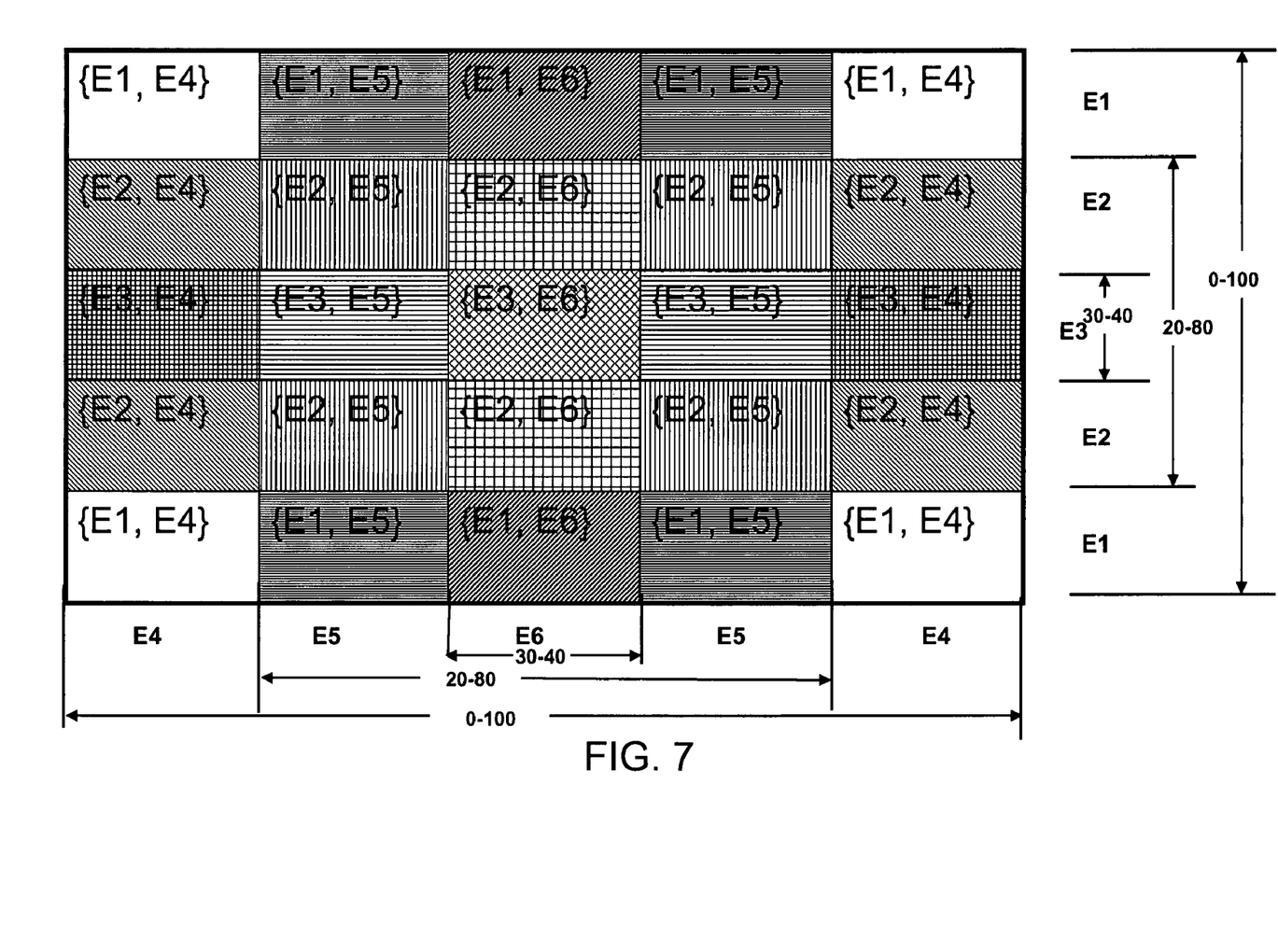
FIG. 7 is a two-dimensional space representing the results of projecting the rules defined on the source port and destination port for the example illustrated in FIG. 4, in accordance with an exemplary embodiment of the invention.

FIG. 7 is a two-dimensional space representing the results of projecting the rules defined on the source port and destination port for the example illustrated in FIG. 4, in accordance with an exemplary embodiment of the invention. As described earlier, in conjunction with step 308 of FIG. 3, the cross product is used to classify the packets, based on the unstructured part of the packet classification rules. A cross product of the equivalence classes is the union of the rules present in the equivalence classes. The cross product of the equivalence classes in dimensions 1 and 2 generates nine regions, shown shaded in FIG. 7, as against 10000 (100×100) regions that are generated in a full-header caching of 100 source port values and 100 destination port values, for the example described in conjunction with FIG. 4.

A region is a combination of rules corresponding to the equivalence classes forming the region. The number of regions formed depends on the values used by a user to define the packet classification rules. Higher the number of regions more the memory system require for classifying the packet. Classification of structured rules takes less memory compared to classification of unstructured rules. As an optimization to above technique RFC and Turbo ACL algorithms for classifying the structured part of a rule can be used. The output of these classification algorithms is used in computing cross-product of the unstructured rules. All regions in FIG. 7 that have the same shading share a common classification result for all logical expressions. In FIG. 7 it can be seen that truth value of variables r1, r2, r3, c1, c2 and c3 remain constant and does not change within any region.

To summarize, the packet classification rules are applied on every packet received by a network interface. The packet classification method provides a technique for splitting the n-dimensional space of the packet header fields into disjoint regions. The splitting is done such that all the packets falling into a region have the same packet classification result. The first packet falling into a region takes a longer time for classification, where the logical expression resulting from user-configured rule is solved. The classification of all subsequent packets falling into the same region gets accelerated and takes less time than the first packet to classify.

The above example in two dimensions can be generalized to d dimensions and n rules in each dimension. Let n rules in each dimension generate k equivalence classes by the method explained earlier. Let $R_{dn}$ denote rule n in dimension d, $E_{dk}$ denotes equivalence class k in dimension d, and $D_d$ denote a set of all equivalence classes in dimension d. In this case, the cross product of $D_1, D_2 \ldots d$ captures the results of function f, where f can be any one of the $((2)^2)^{(d*n)}$ functions defined on variables $R_{11} \ldots R_{1n}, R_{21} \ldots R_{2n} \ldots$, and $R_{d1} \ldots R_{dn}$. Therefore, for any given packet P, if the packet header is split into d fields matching the d dimensions of the user-defined rules, the lookup in each of the d dimensions gives a unique equivalence class, matching the packet in that dimension. The cross product of these equivalence classes is used to store the result of function f.

Therefore, to summarize, for any given packet P, concatenation or cross-product of results of range lookup in d dimensions of the packet header can be used as a key to store the results of function f, where f can be any one of the possible $((2)^2)^{(d*n)}$ functions defined on variables $R_{11} \ldots R_{1n}, R_{21} \ldots R_{2n} \ldots$, and $R_{d1} \ldots R_{dn}$.

The function f defining the packet classification rules in FIG. 4 may be structured, as in the ACL format.

For example, f (R1, R2, R3, C1, C2, C3)= if (R1 && C1) then {Action 1} else if (R2 && C2) then {Action2} else if (R3 && C3) then {Action 3}      (2)

However, the composite packet classification rules may not be as structured as an ACL and may be unstructured as in a Modular QoS Command Line Interface (MQC) class-map list.

For example, f (R1, R2, R3, C1, C2, C3)= if (R1 && C1) then {Action 1} else if (R2||C2||R3||C3) then {Action2}      (3)

Therefore, in an exemplary embodiment of the invention, the structured part of the packet classification rules is in the ACL format. In another exemplary embodiment of the invention, the packet classification rules are MQC class-maps. In yet another exemplary embodiment of the invention, the MQC class-map comprises at least one rule in Cisco ACL format.

Expression (2) above is in CISCO ACL rule format. In expression (2), the first rule of dimension 1 is bound to the first rule of dimension 2 by 'AND' relation. If a user is interested in configuring C1 but not R1, then the user can mark R1 with a wildcard entry. The ACL format has AND relation between the corresponding elements in different dimensions. In the equivalence classes formed above, the cross-product of E2 with E5 and E6 generate two different regions, as follows:
E2×E5={R1, R2, C1, C2} and
E2×E6={R1, R2, C1, C2, C3}

In accordance with the ACL rule structure, R1 can co-exist only with C1. Similarly, R2 and C2, and R3 and C3, coexist. Consequently, by eliminating all the member elements that do not satisfy this AND relation between the corresponding elements from the two dimensions, we have
E2×E5={R1, R2, C1, C2} and
E2×E6={R1, R2, C1, C2}

It is to be-noted that C3 has been eliminated from the cross product E2×E6 since C3 cannot coexist with R1, R2, C1 and C2. The above two cross-product regions are identical and can be merged to form a single region. Similar logic can be applied to all the nine regions. In the example illustrated in FIG. 4, for the case of ACL format of the rule structures, only three regions are needed. Therefore, taking advantage of the structure present in the packet classification rules can reduce the number of regions and the space required to store the packet classification. Further R1 AND C1, R2 AND C2, and R3 AND C3 are composite rules. The Turbo ACL and RFC algorithm output indicates which of the composite rules satisfy the given packet. In FIG. 6, a lookup in array 602 determines the equivalence class for dimension 1 and a lookup in array 604 determines the equivalence class for dimension 2. The lookup output of array 602 and array 604 generates equivalence ids that are exact representation of set of all matching rules in respective dimensions. Therefore, output from Turbo classification and RFC algorithm is compatible as input to cross product computation of unstructured rules.

By using Turbo classification and RFC algorithm for the structured portion of the rule and the cross product to capture the unstructured portion of the rule, the space complexity may be lowered.

Space complexity = O (Turbo (D1 ... Di) *
    Turbo (D (i+1) ... Dj) *
    , ... *
    Turbo(D1 ... Dd))
    (1 <= i, j, 1 <=d)

-continued where,
* = denotes multiplication operator
Turbo( ) is the reduced number of equivalence classes generated by Turbo classification.

The round braces enclose a range of dimensions within which the rule is structured and Turbo Classification can be directly applied.

The classification method described above is used to cache MQC policy-maps. Consider an MQC packet classification rule for QoS application.

Service-policy input: test-mrc
Class-map: XOR-class1 (match-any)
   Match: class-map match-all class-operand1
   Match: access-group 100
   Match: not source-address mac 0260.0BAF.30A0
   Match: class-map match-all class-operand2
   Match: not access-group 100
   Match: source-address mac 0260.0BAF.30A0
     QoS Set precedence 1
Class-map: class-default (match-any)
   Match: any The rule has a service policy named test-mrc. The service policy comprises two class maps, class-operand 1 and class-operand 2. The class maps have two match criteria, access-group and source-address mac 0260.0BAF.30A0. Service policy test-mrc is an unstructured rule.

Figure 8:
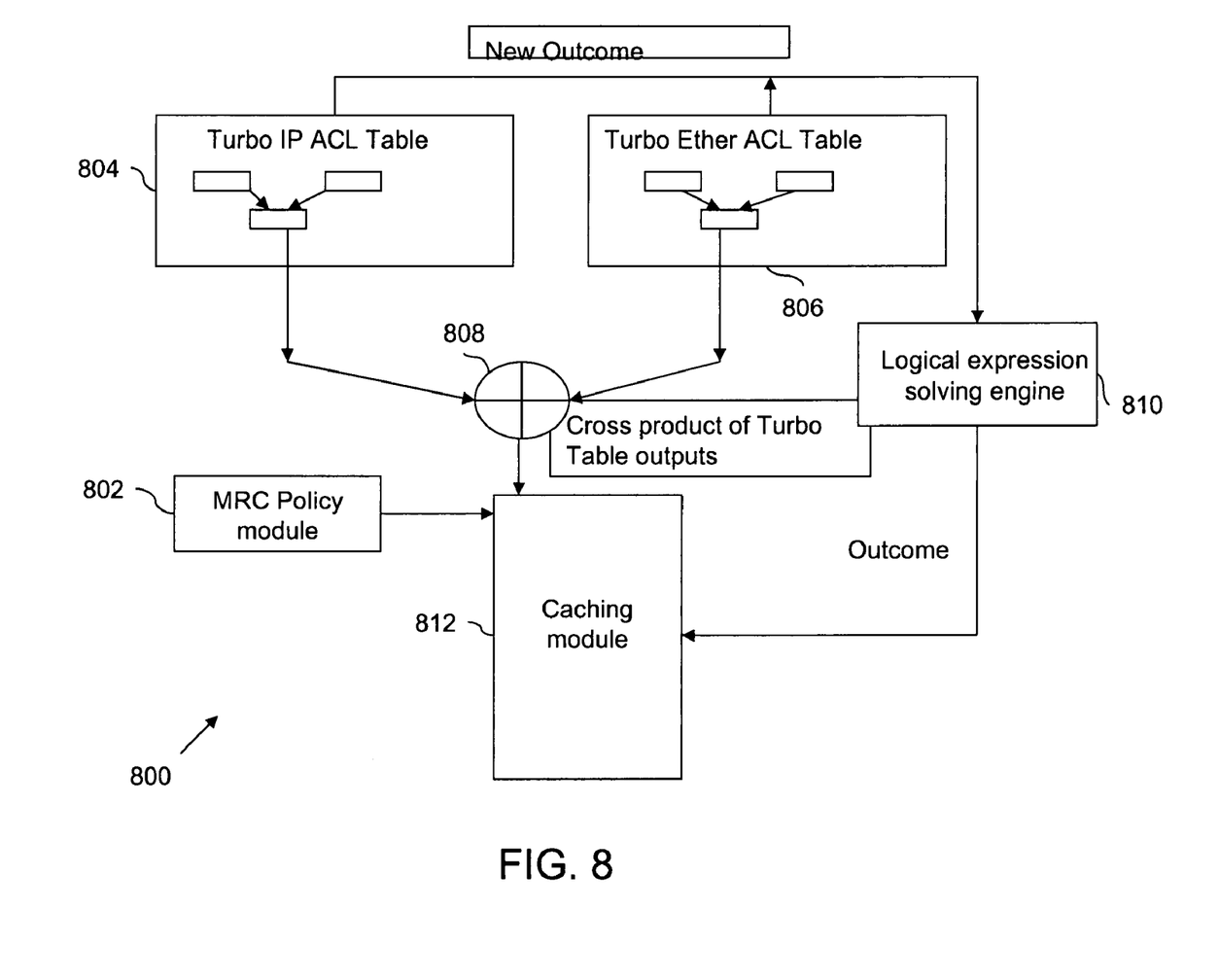
FIG. 8 is a block diagram illustrating the process of caching, in accordance with an exemplary embodiment of the invention.

FIG. 8 is a block diagram illustrating the process of caching using service policy test-mrc, in accordance with an exemplary embodiment of the invention. A meta rule caching (MRC) policy module 802 generates and maintains a list of references to turbo classification tables, to be used during the classification of a packet. In the above example, policy module test-mrc has match criteria's involving IP access-group and Ethernet source MAC address. This means that a Turbo IP classification module 804 and a Turbo Ether classification module 806 classify all the packets passing through policy module test-mrc. Hence, policy module test-mrc has a reference to Turbo IP classification table and Turbo Ether classification table. The classification of a packet by Turbo IP module 804 generates an equivalence id. In this case, an equivalence id denotes a list of all access-control entries matched by the packet. The concept of an equivalence id has been explained earlier in conjunction with FIG. 6. Similarly, the classification of a packet by Turbo Ether module 806 generates an equivalence id. In this case, equivalence id denotes a list of all source MAC addresses matched by the packet.

MRC policy module 802 receives a packet directed towards a router. If the eq id associated with the packet is new, i.e., none of the earlier packet got classified in the equivalence class corresponding to this eq id, then a logical expression solving engine module 810 uses the existing equivalence classes to solve the logical expression associated with the packet, for example, test-mrc. Logical expression solving engine module 810 solves the policy logical expression for all newly generated cross product entries and stores the result at the corresponding locations in a caching module 812. The details of solving of the logical expression are hereinafter described.

The equivalence classes give the list of classification rules satisfied by the packet and this information is used for solving the logical expression for a packet. For example, in the example above, logical expression solving engine module 810 does a cross product of the new IP Turbo classification table equivalence id with each of the previously generated equivalence ids of Turbo Ether classification table. For example, say E3 is the new Turbo IP equivalence id and E4, E5 are the old equivalence ids of Turbo Ether table. Logical expression solving engine module 810 solves the test-mrc policy logical expression for cross product entries E3E4 and E3E5. Each cross product entry comprises an equivalence id corresponding to Turbo IP classification, say E3, and an equivalence id corresponding to Turbo Ether classification, say E4. Equivalence id E3 gives the list of all IP Access-control entries satisfied by the packets falling into E3 equivalence class. Equivalence id E4 gives the list of all source MAC addresses matched by the packets falling into E4 equivalence class. Hence, E3E4 gives the list of all access control entries and source MAC addresses matched by the packets falling into equivalence class E3 and equivalence class E4 respectively.

Logical expression solving engine module 810 subsequently uses the information available from equivalence classes E3 and E4 to solve the test-mrc policy for cross product entry E3E4. The solution of the logical expression for a cross product entry such as test-mrc policy for cross product entry E3E4, gives an action, say action-1, to be performed if a packet falls into equivalence classes E3 and E4. This action is subsequently stored in caching module 812 at location E3E4, i.e., the location E3E4 has a reference to action-1.

The method used for solving a logical expression can be implementation specific. After packet classification with the Turbo IP table and the Turbo Ether table, program control is sent back to MRC policy module 802. MRC policy module 802 then passes the program control to a cross product module 808.

Cross product module 808 carries out the cross product of the equivalence ids generated by the turbo classification tables such as Turbo IP classification module 804 and Turbo ether classification module 806. The output of cross product module 808 is then used for indexing into a MRC policy table stored in caching module 812. A corresponding action that is stored in caching module 812 is then taken for a particular classification.

Subsequently, if a new packet arriving at MRC policy module 802 gets classified in the region E3E4, the corresponding action is taken without solving the logical expression since an entry corresponding to E3E4 already exists in caching module 812.

In case a packet classification rule contains only access groups in a policy map for example Turbo IP ACL table 804, then a lookup in Turbo ether table 806 is not required. Therefore, a cross product is not required. Thus, an action corresponding to a packet classification performed only by Turbo IP ACL table 804 is taken. This is referred to as single step caching.

Similarly, the method can be generalized to more than two Turbo classification tables.

Figure 9:
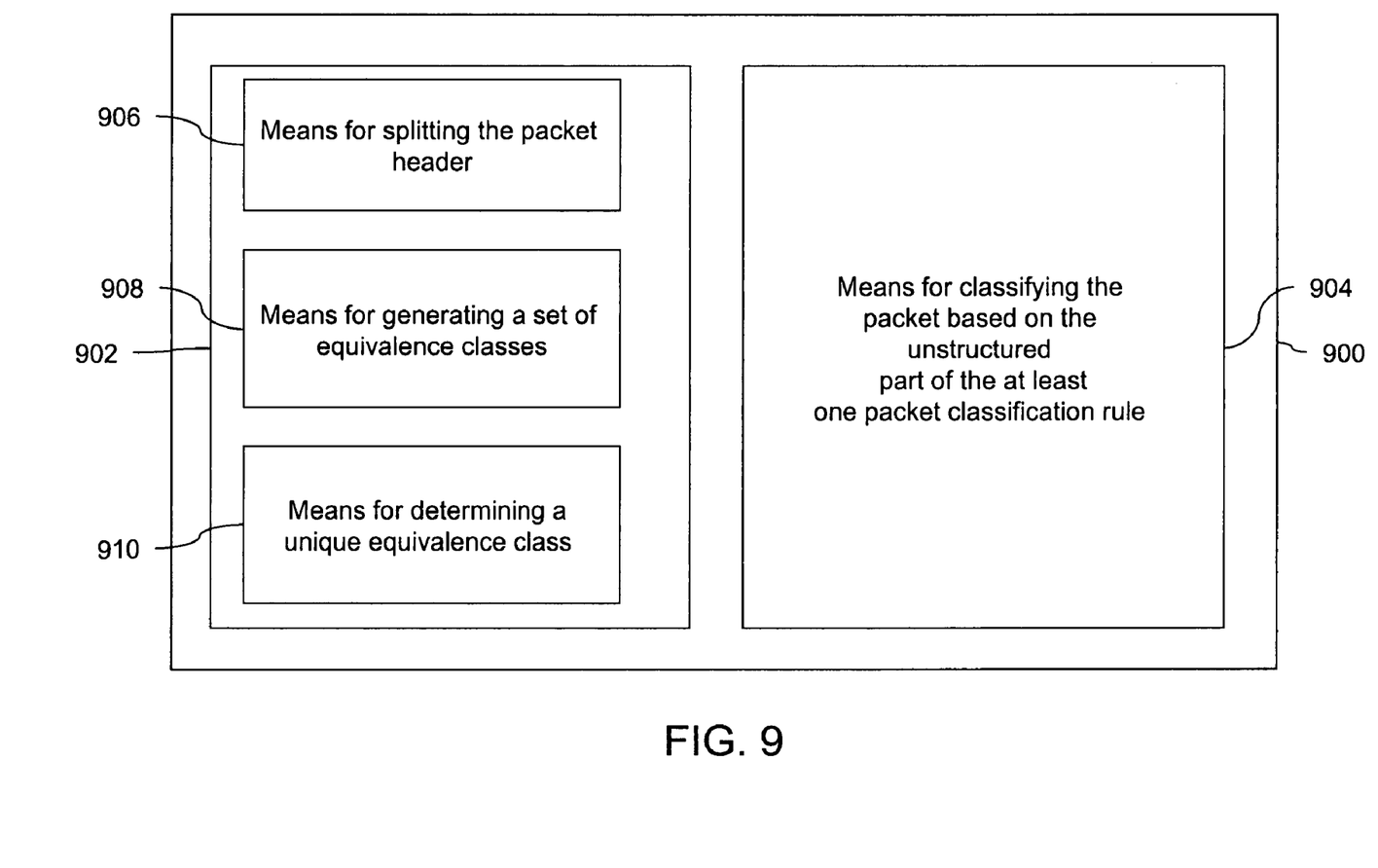
FIG. 9 is a block diagram of a system for Modular QoS Command Line Interface (MQC) packet classification, in accordance with an exemplary embodiment of the invention.

FIG. 9 is a block diagram of system 900 for MQC packet classification, in accordance with an exemplary embodiment of the invention. System 900 includes a means for classifying the packets 902, based on the structured part of the classification rules and a means for classifying the packets 904, based on the unstructured part of the packet classification rules. Means for classifying the packets 902, based on the structured part of the classification rules, comprises a means for splitting 906 the packet header into a pre-determined number of fields; a means for generating 908, a set of equivalence classes for each of the pre-determined number of fields; and a means for determining 910, a unique equivalence class matching the packet in each of the dimensions. In various embodiments of the invention, the system elements of system 900 are implemented as part of MRC policy module 802, cross product module 808, logical expression solving engine module 810, and caching module 812. For example, means for classifying packets 902 can include various turbo classification tables such as turbo IP ACL table 804 and turbo ether table 806. Means for classifying packets 904 can include cross product module 808 and logical expression solving engine module 810.

In various embodiments, each of the system elements of system 900, i.e., 902, 904, 906, 908 and 910, can be implemented in the form of a software module that can reside in a computer.

Embodiments of the present invention have the advantage that they support MQC packet classification and are fast and scalable. Further, the storage space required for the caching is less, compared to the storage space required for full-header caching. Further, the two-tier classification and caching algorithm takes advantage of the speed and relatively less storage space property of Turbo classification, to capture all the user-defined rules.

Although the invention has been discussed with respect to specific embodiments thereof, these embodiments are merely illustrative, and not restrictive, of the invention. For example, in one exemplary embodiment of the invention a Turbo ACL algorithm can perform classification of the packets based on the structured part of the packet classification rules. In another exemplary embodiment of the invention, classification of the packets based on the structured part of the packet classification rules is performed by an RFC algorithm.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer were employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, 'a', 'an', and 'the' includes plural references unless the context clearly dictates otherwise. Also, as used in the description herein and throughout the claims that follow, the meaning of 'in' includes 'in' and 'on', unless the context clearly dictates otherwise.

The foregoing description of the illustrated embodiments of the present invention, including what is described in the abstract, is not intended to be exhaustive or limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of the illustrated embodiments of the present invention, and are to be included within the spirit and scope of the present invention.

Therefore, while the present invention has been described herein with reference to the particular embodiments thereof, latitude of modification and various changes and substitutions are intended in the foregoing disclosures. It will be appreciated that in some instances some features of the embodiments of the invention will be employed without the corresponding use of other features, without departing from the scope and spirit of the invention as set forth. Therefore, many modifications may be made, to adapt a particular situation or material to the essential scope and spirit of the present invention. It is not intended that the invention is limited to the particular terms used in the claims and/or to the particular embodiment disclosed as the best mode contemplated for carrying out this invention, but that it will include any and all embodiments and equivalents falling within the scope of the appended claims.

What is claimed is:

1. A method, comprising:
    receiving a packet having a plurality of fields in a header of the packet;
    defining at least one packet classification rule using a command-line interface (CLI), wherein the at least one packet classification rule comprises a structured part and an unstructured part, the structured part having a predetermined logical operator relation between at least two of the plurality of fields, the unstructured part having a user configurable relation among the plurality of fields;
    performing a first classification of the packet based on the structured part of the at least one packet classification rule;
    using the predetermined logical operator relation between the at least two of the plurality of fields for the structured part in the first classification to provide a first classification result;
    performing a second classification of the packet based on the unstructured part of the at least one packet classification rule and the first classification result; and
    using the user configurable relation among the plurality of fields with keywords identifying values in the plurality of fields for the unstructured part in the second classification, wherein the first and second classifications form a classification of the packet.

2. The method of claim 1, wherein the classification of the packet is done based on Quality of Service (QoS).

3. The method of claim 1, wherein the classification of the packet is done based on class of service (COS).

4. The method of claim 1, wherein the plurality of fields have fixed positions in the structured part of the at least one packet classification rule.

5. The method of claim 1, wherein the at least one packet classification rule comprises Modular Quality of Service Command Line Interface (MQC) class maps.

6. A method for classification of a packet based on class of service (COS) and Quality of Service (QoS), and packet classification rules, the method comprising:
    defining the packet classification rules using a command-line interface (CLI), wherein the packet classification rules comprise a structured part and an unstructured part, the structured part having a predetermined logical operator relation between a predetermined number of fields, the unstructured part having a user configurable relation among the predetermined number of fields;
    splitting a header of the packet into the predetermined number of fields, the predetermined number being equal to a number of dimensions of the packet classification rules;
    generating a set of equivalence classes for each of the predetermined number of fields;
    determining a unique equivalence class matching the packet in each of the fields, wherein the splitting, the generating, and the determining are based on the structured part of the packet classification rules;
    using the predetermined logical operator relation between at least two of the fields for the structured part in the splitting, the generating, and the determining;
    using a cross-product of the unique equivalence classes to capture results of the classification based on the unstructured part of the packet classification rules; and
    using the user configurable relation among the fields with keywords identifying values in the fields for the unstructured part of the classification rules.

7. The method of claim 6, wherein the fields have fixed positions in the structured part of the packet classification rules.

8. The method of claim 6, wherein the packet classification rules comprise a Modular Quality of Service Command Line Interface (MQC) class map.

9. An apparatus, comprising:
    means for receiving a packet having a plurality of fields in a header of the packet;

means for defining at least one packet classification rule using a command-line interface (CLI), wherein the at least one packet classification rule comprises a structured part and an unstructured part, the structured part having a predetermined logical operator relation between at least two of the plurality of fields, the unstructured part having a user configurable relation among the plurality of fields;

means for performing a first classification of the packet based on the structured part of at least one packet classification rule;

means for using the predetermined logical operator relation between the at least two of the plurality of fields for the structured part in the first classification to provide a first classification result;

means for performing a second classification of the packet based on the unstructured part of the at least one packet classification rule and the first classification result; and means for using the user configurable relation among the plurality of fields with keywords identifying values in the plurality of fields for the unstructured part in the second classification, wherein the first and second classifications form a classification of the packet.

10. The apparatus of claim 9, wherein the means for performing the first classification of the packet based on the structured part of the at least one packet classification rule comprises:

means for splitting the header of the packet into a predetermined number of the plurality of fields;

means for generating a set of equivalence classes for each of the predetermined number of fields; and means for determining a unique equivalence class matching the packet in each of the plurality of fields.

11. The apparatus of claim 10, wherein the means for determining the unique equivalence class matching the packet comprises using an Access Control List (ACL) format.

12. The apparatus of claim 10, wherein the predetermined number of the fields is equal to a number of dimensions of the at least one packet classification rule.

13. The apparatus of claim 9, wherein the plurality of fields have fixed positions in the structured part of the at least one packet classification rule.

14. The apparatus of claim 9, wherein the structured part of the at least one packet classification rule is in Access Control List (ACL) format.

15. The apparatus of claim 9, wherein the unstructured part of the at least one packet classification rule comprises structured rules as variables.

16. The apparatus of claim 9, wherein the at least one packet classification rule is a Modular Quality of Service Command Line Interface (MQC) class-map.

17. An apparatus for classification of a packet, the apparatus comprising:

a rule entry module for defining a packet classification rule using a command-line interface (CLI), wherein the a packet classification rule comprises a structured part and an unstructured part, the structured part having a predetermined logical operator relation between at least two of a plurality of fields of a header of the packet, the unstructured part having a user configurable relation among the plurality of fields;

a meta rule caching (MRC) policy module for generating and maintaining a list of references to turbo classification tables, the turbo classification tables comprising a set of matching criteria for the classification of the packet;

a logical expression solving engine module coupled to the turbo classification tables and configured to solve a logical expression defined in the structured part of the packet classification rule;

a cross-product module receiving outputs from the turbo classification tables and configured to generate a cross-product of equivalence identifiers therefrom, and using the user configurable relation among the plurality of fields in the packet with keywords identifying values in the plurality of fields for the unstructured part of the packet classification rule; and a caching module for storing results of the logical expression solving engine module at a location determined by the cross-product module.

18. An apparatus for classification of a packet, the apparatus comprising:

a processing system including a processor coupled to a user input device;

a computer-readable storage device including instructions executable by the processor, the storage device comprising:

one or more instructions for defining packet classification rules using a command-line interface (CLI), wherein the packet classification rules comprise a structured part and an unstructured part, the structured part having a predetermined logical operator relation between a predetermined number of fields, the unstructured part having a user configurable relation among the predetermined number of fields;

one or more instructions for splitting a header of the packet into the predetermined number of fields, the predetermined being equal to a number of dimensions of the packet classification rules;

one or more instructions for generating a set of equivalence classes for each of the predetermined number of fields;

one or more instructions for determining a unique equivalence class matching the packet in each of the fields, wherein the splitting, the generating, and the determining are based on the structured part of the packet classification rules;

one or more instructions for using the predetermined logical operator relation between at least two of the fields for the structured part of the packet classification rules in the splitting, the generating, and the determining;

one or more instructions for using a cross-product of the unique equivalence classes to capture results of the classification based on the unstructured part of the packet classification rules; and one or more instructions for using the user configurable relation among the fields with keywords identifying values in the fields for the unstructured part of the packet classification rules.

19. A computer-readable storage device including instructions executable by a processor, the storage device comprising:

one or more instructions for defining packet classification rules using a command-line interface (CLI), wherein the packet classification rules comprise a structured part and an unstructured part, the structured part having a predetermined logical operator relation between a predetermined number of fields, the unstructured part having a user configurable relation among the predetermined number of fields;

one or more instructions for splitting a header of a packet into the predetermined number of fields, the predetermined number being equal to a number of dimensions of the packet classification rules;

one or more instructions for generating a set of equivalence classes for each of the predetermined number of fields;

one or more instructions for determining a unique equivalence class matching the packet in each of the fields, wherein the splitting, the generating, and the determining are based on the structured part of the packet classification rules;

one or more instructions for using the predetermined logical operator relation between at least two of the fields for the structured part of the packet classification rules in the splitting, the generating, and the determining;

one or more instructions for using a cross-product of the unique equivalence classes to capture results of the classification based on the unstructured part of the packet classification rules; and one or more instructions for using the user configurable relation among the fields with keywords identifying values in the fields for the unstructured part of the packet classification rules.

20. An apparatus for classification of a packet, the apparatus comprising:

a processing system including a processor coupled to a user input device; and a computer-readable storage device including instructions executable by the processor, the storage device comprising:

one or more instructions for defining packet classification rules using a command-line interface (CLI) at the user input device, wherein the packet classification rules comprise a structured part and an unstructured part, the structured part having a predetermined logical operator relation between a predetermined number of fields, the unstructured part having a user configurable relation among the predetermined number of fields;

one or more instructions for splitting a header of the packet into the predetermined number of fields, the predetermined number being equal to a number of dimensions of the packet classification rules;

one or more instructions to classify the structured part of the packet classification rules with an Access Control List (ACL) algorithm;

one or more instructions for using the predetermined logical operator relation between at least two of the fields for the structured part of the packet classification rules;

one or more instructions for using a cross-product of the ACL algorithm outcomes to capture results of the unstructured part of the packet classification rules; and one or more instructions for using the user configurable relation among the fields with keywords identifying values in the fields for the unstructured part of the packet classification rules.

21. A computer-readable storage device including instructions executable by a processor, the storage device comprising:

one or more instructions for defining packet classification rules using a command-line interface (CLI), wherein the packet classification rules comprise a structured part and an unstructured part, the structured part having a predetermined logical operator relation between a predetermined number of fields, the unstructured part having a user configurable relation among the predetermined number of fields;

one or more instructions for splitting a header of a packet into the predetermined number of fields, the predetermined number being equal to a number of dimensions of the packet classification rules;

one or more instructions to classify the structured part of the packet classification rules with an access control list (ACL) algorithm;

one or more instructions for using the predetermined logical operator relation between at least two of the fields for the structured part of the packet classification rules;

one or more instructions for using a cross-product of the ACL algorithm outcomes to capture results of the unstructured part of the packet classification rules; and one or more instructions for using the user configurable relation among the fields with keywords identifying values in the fields for the unstructured part of the packet classification rules.

22. A computer-readable storage device including instructions executable by a processor, the storage device comprising:

one or more instructions for defining packet classification rules using a command-line interface (CLI), wherein the packet classification rules comprise a structured part and an unstructured part, the structured part having a predetermined logical operator relation between a predetermined number of fields, the unstructured part having a user configurable relation among the predetermined number of fields;

one or more instructions for splitting a header of a packet into the predetermined number of fields, the predetermined number being equal to a number of dimensions of the packet classification rules;

one or more instructions to classify the structured part of the packet classification rules with a recursive flow classification (RFC) algorithm;

one or more instructions for using the predetermined logical operator relation between at least two of the fields for the structured part of the packet classification rules;

one or more instructions for using a cross-product of the RFC algorithm outcomes to capture results of the unstructured part of the packet classification rules; and one or more instructions for using the user configurable relation among the fields with keywords identifying values in the fields for the unstructured part of the packet classification rules.

* * * * *